United States Patent
Saito (10) Patent No.: US 6,608,964 B1
(45) Date of Patent: Aug. 19, 2003

(54) EDITING DEVICE AND EDITING METHOD

(75) Inventor: Kenji Saito, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/068,930

(22) PCT Filed: Sep. 22, 1997

(86) PCT No.: PCT/JP97/03356
§ 371 (c)(1),
(2), (4) Date: May 21, 1998

(87) PCT Pub. No.: WO98/14007
PCT Pub. Date: Apr. 2, 1998

(30) Foreign Application Priority Data

Sep. 25, 1996 (JP) .............................. 8-252605

(51) Int. Cl.[7] ................................ H04N 5/93
(52) U.S. Cl. ............................ 386/52; 386/46; 345/723
(58) Field of Search ........................ 386/52–55, 64, 386/46, 4; 360/13; 345/328, 302, 473–475, 723, 839; 369/83, 93

(56) References Cited

U.S. PATENT DOCUMENTS

| | | | |
|---|---|---|---|
| 5,182,677 A | * 1/1993 | Kizu et al. | 386/55 |
| 5,218,672 A | 6/1993 | Morgan et al. | |
| 5,307,456 A | 4/1994 | MacKay | |
| 5,355,450 A | 10/1994 | Garmon et al. | |
| 5,519,828 A | 5/1996 | Rayner | |
| 5,581,530 A | * 12/1996 | Iizuka et al. | 360/13 |
| 5,583,791 A | 12/1996 | Harigaya et al. | |
| 5,692,117 A | * 11/1997 | Berend et al. | 345/475 |
| 5,760,767 A | * 6/1998 | Shore et al. | 345/723 |
| 5,859,662 A | * 1/1999 | Cragun et al. | 386/52 |
| 5,898,430 A | * 4/1999 | Matsuzawa et al. | 345/302 |

FOREIGN PATENT DOCUMENTS

| | | |
|---|---|---|
| EP | 0 438 299 | 7/1991 |
| EP | 0 526 064 | 2/1993 |
| GB | 2 274 223 | 7/1994 |
| JP | 63-59181 | 3/1988 |
| JP | 63-102574 | 5/1988 |
| JP | 4-345284 | 12/1992 |
| JP | 6-86210 | 3/1994 |
| JP | 8-163479 | 5/1996 |
| WO | 93/08664 | 4/1993 |

* cited by examiner

*Primary Examiner*—Thai Tran
*Assistant Examiner*—Christopher Onuaku
(74) *Attorney, Agent, or Firm*—Wenderoth, Lind & Ponack, L.L.P.

(57) ABSTRACT

In an editing apparatus of audiovisual information including moving picture information, audiovisual information is stored in a hard disk drive or the like, and editing information is stored in a hard disk drive. After retrieve is started, pictures are extracted and displayed among the picture information from the current position to a destination position, and a picture at the retrieve destination is displayed thereafter. Thus, after a situation on the shift of the pictures is displayed during some time, an editor can recognize the completion of retrieve. The retrieve mode includes a constant time retrieve, a constant speed retrieve, and an accelerating and decelerating retrieve. A picture indicating a state under retrieve can be added to the pictures during retrieve.

45 Claims, 4 Drawing Sheets

EDITING DEVICE AND EDITING METHOD

DETAILED EXPLANATION OF THE INVENTION

1. Technical Field

The invention relates to an editing apparatus and an editing method for editing and reproducing audiovisual information by using a storage medium such as a magnetic disk (hard disk) or a magneto-optic disk having a fast retrieve speed.

2. Background Art

Previously, audiovisual information including moving picture information is edited by connecting a video cassette recorder (VCR) used for reproduction and another VCR used for recording to an editing apparatus. Audiovisual information is reproduced from the VCR used for reproduction and edited by the editing apparatus, and the edited audiovisual information is recorded in the VCR used for recording.

Recently, compression technology of audiovisual information is improved, and it becomes possible to record and reproduce audiovisual information in a storage apparatus such as a hard disk drive (HDD) having fast retrieve speed. Then, an editing apparatus using an HDD or the like is developed, and it is called as a nonlinear editing apparatus.

When a plurality of pairs of a start end and a final end (editing points) of effective information (called as event) are set in the stored audiovisual information, after reproducing a final end of an event, it is possible to reproduce a start end of a next event successively, because retrieve can be performed at a high speed in an HDD, and preview of editing result is possible immediately. In other words, in a nonlinear editing apparatus, editing completes only by inputting editing points, and it is not needed to record the result in the VCR for recording.

However, a nonlinear editing apparatus has problems explained below. When reproduction of a specified position in audiovisual information (hereinafter referred to as retrieve) is performed in editing, retrieve time for displaying the desired audiovisual information is short. Then, the picture at the current position is shifted instantaneously to the resultant picture of retrieve. Therefore, because the change is performed instantaneously, it is difficult for a user to recognize the completion of the retrieve. Further, because audiovisual information is not displayed during retrieve, information around the specified position cannot be recognized. Thus, pictures before and after the specified position are often confirmed after the completion of retrieve. On the other hand, when retrieve is performed on a prior art editing apparatus using VCRs, pictures of FF (fast feed)/REW (rewind) during retrieve are inserted. Thus, the completion of retrieve can be recognized, and information around the specified position for retrieve can also be recognized. If retrieve with a nonlinear editing apparatus can be performed similarly to that with the prior art editing apparatus using VCRs, editing can be performed more efficiently.

An object of the invention is to provide a user-friendly nonlinear editing apparatus.

DISCLOSURE OF INVENTION

An editing apparatus according to the invention is an editing apparatus for editing audiovisual information including at least moving picture information and audio information accompanied with the moving picture information. The input audiovisual information is stored in a first storage device (having a fast retrieve speed, preferably, a hard disk, a semiconductor memory device or an optical disk). Pictures read from the first storage device are displayed by a display device. Editing information on the audiovisual information stored in the first storage device including a position of effective information is set with an operation device. The editing information is stored in a second storage device. A display controller makes the display device display pictures based on the editing information stored in the second storage device. Further, the display controller makes the display device display pictures between first and second positions intermittently when a current picture at the first position is changed to a picture at the second position. That is, when the position of the current picture (the first position) is shifted to the retrieve destination position (the second position) the shift is not performed instantaneously, but pictures between the first and second positions are extracted and displayed to make it possible for a user to recognize the picture of the result of the retrieve. The modes of retrieve includes constant speed retrieve, constant time retrieve and accelerating and decelerating retrieve. Further, a selection means may be provided so that a user can select one of the retrieve modes.

In the constant speed retrieve, when the current picture at the first position is changed to the picture at the second position (destination position), the display controller makes the display device display pictures intermittently at an equal interval between a first position and a second position. Thus, the extraction interval of picture frames is constant between the current position and the destination position, and, the retrieve result (the second position) is displayed after a time in proportion to the distance.

In the constant time retrieve, when the current picture at the first position is changed to the picture at the second position, the display controller makes the display device display pictures of a predetermined number extracted intermittently at an equal interval between the first and second positions. Thus, a constant number of the pictures are extracted at equal interval between the current position and the destination position, and the retrieve result (the second position) is displayed after a constant time.

In the accelerating and decelerating retrieve, when the current picture at the first position is changed to the picture at the second position, until a middle point between the first and second positions, the display controller extracts pictures in pictures between the first and second positions at an interval in proportion to a distance between the first position and a display position (or at an interval for a maximum speed when the interval exceeds an interval for the maximum speed), and displays the pictures by shifting the display position at an increasing speed or at the maximum speed. On the other hand, after the middle point, it extracts pictures at an interval in proportion to a distance between the display position and the second position (or at an interval for a maximum speed when the interval exceeds the interval for the maximum speed), and displays the pictures by shifting the display position at the maximum speed or at a decreasing speed. Thus, the speed for display is accelerated from the current position and reaches to the maximum speed when the distance is large, and is decelerated. That is, pictures are displayed analogously to the shifting state when a VCR is used in a prior art apparatus.

Preferably, when the current picture at the first position is shifted to the picture at the second position, while pictures between the first and second positions are displayed, an additional visual information which means a state under retrieve is displayed at the same time. Thus, information representing a state under retrieve is added when picture information is displayed.

Preferably, a compressor compresses the input audiovisual information and sends it to the first storage device. On reproduction, an expander expands the compressed information stored in the first storage device for display.

Preferably, an audio reproduction device is provided, and audio information in correspondence to a picture to be displayed by the display device is extracted from the audiovisual information, and the audio information is reproduced in correspondence to the audiovisual information.

EMBODIMENTS OF THE INVENTION

Referring now to the drawings, an editing apparatus according to an embodiment of the invention is explained with reference to the accompanied drawings.

Figure 1:
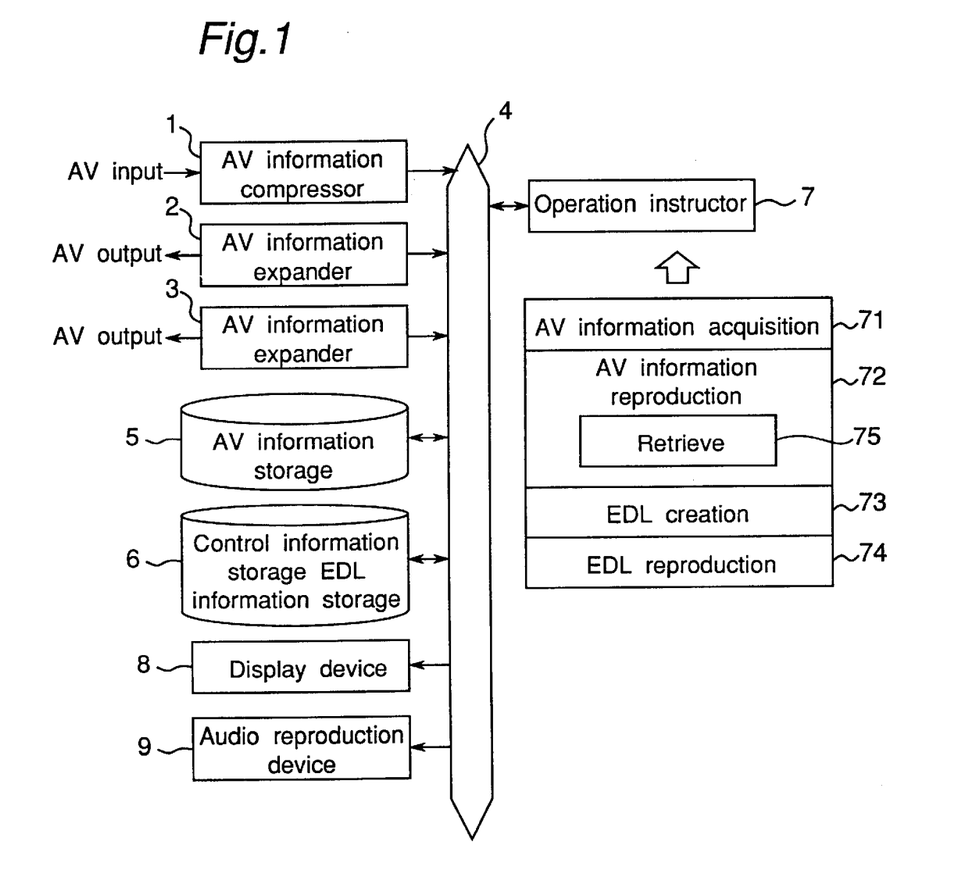
FIG. 1 is a function block diagram of an editing apparatus of an embodiment of the invention.

FIG. 1 shows a function block diagram of the editing apparatus of the embodiment of the invention. The editing apparatus uses a hard disk, as a storage device having a fast retrieve speed, which is a storage medium of information including at least moving picture information and audio information accompanied by the moving picture information (that is, audio-visual information). Alternatively, a semiconductor memory device or an optical disk may also be used. An audiovisual (hereinafter referred to also as AV) information compressor 1 compresses audiovisual information received from a video cassette recorder (VCR) for reproduction. An AV information expander 2, 3 expands compressed audiovisual information and sends it to another VCR for recording. A first storage device 5 having a fast retrieve speed records and reproduces the audiovisual information. A second storage device 6 stores control information to be used by an operation instructor 7. The various information is sent and received through a common signal path (bus) 4. The operation instructor 7 instructs operations to the components 1, 2, 3, 5, 6, 8 and 9 through the bus 4. The operations are performed according to a program of a central processing unit (CPU) provided in the operation instructor 7 as operations by the CPU. The content of the operations executed by the operation instructor 7 includes AV information acquisition 71, AV information reproduction 72, EDL creation 73, EDL reproduction 74 and retrieve 75, and they are explained later.

Figure 2:
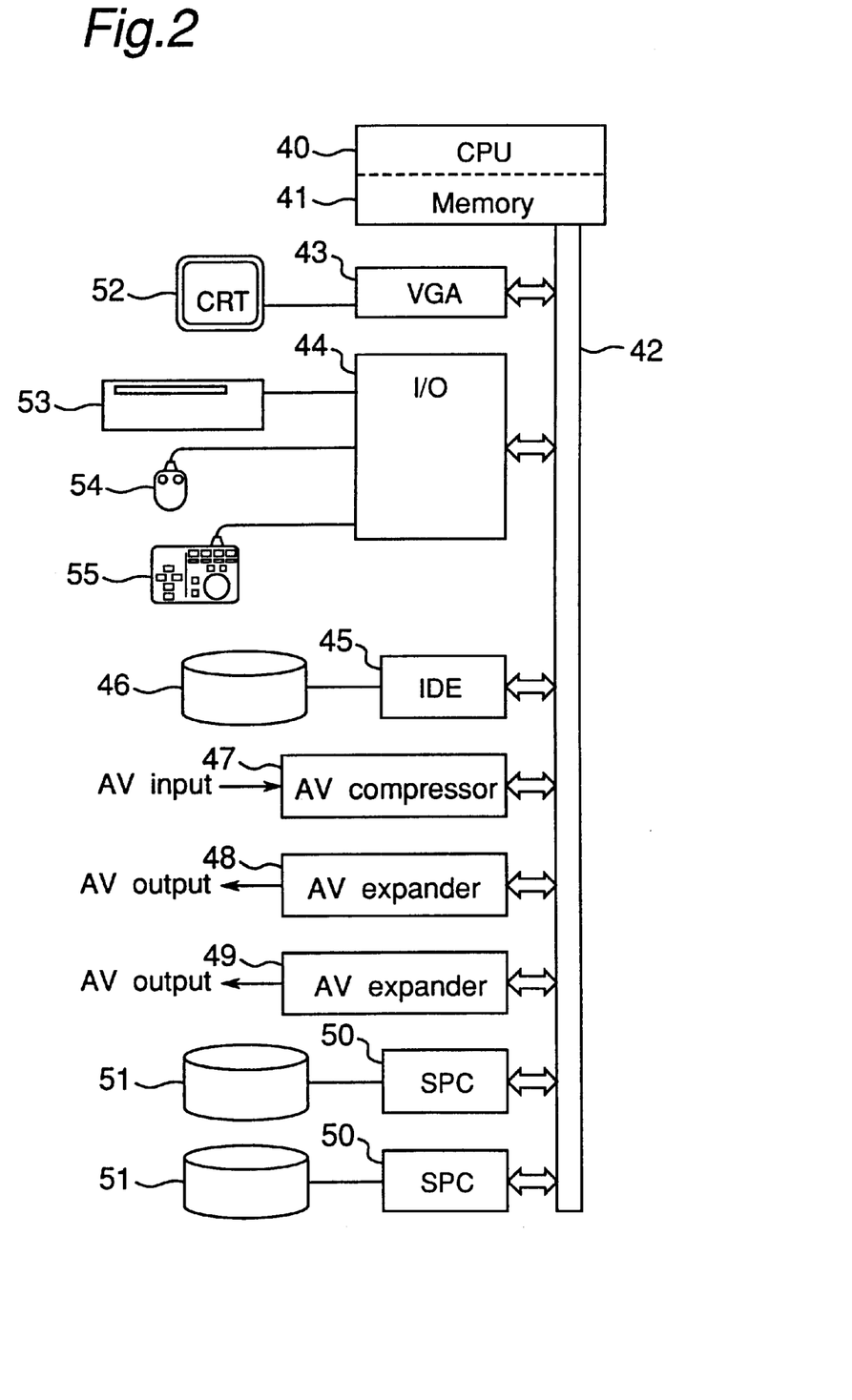
FIG. 2 is a block diagram of hardware structure of the editing apparatus of the embodiment of the invention.

FIG. 2 shows an example of a hardware structure of the editing apparatus. The CPU 40 controls the editing apparatus. A memory device 40 of 24 to 32 MB (megabytes) is provided. The memory device 40 stores information used for the operation by the CPU 40. A first hard disk drive 46 stores control information for executing each of the operations of AV acquisition, AV information reproduction, EDL creation and EDL reproduction, and the CPU 40 executes the operations according to the information.

An internal common signal path (internal bus) 42 for information transmission uses PCI-bus and (E) ISA-bus. ISA-bus may also be used. These buses are examples of connection bus for information transmission. Information transmission between the blocks are performed according to an instruction from the CPU 40. The internal bus 42 is connected to the following various components.

A VGA (Video Graphics Adaptor) card (printed circuit board) 43 produces a picture to be displayed in a cathode ray tube (display device) 52. The CRT (display device) 52 displays a picture designated by the CPU 40.

An I/O card (input/output printed circuit board) 44 is connected to a keyboard 53, a mouse 54 and a jog pad 55. The jog pad 55 is an operation instrument exclusive for editing control. The keyboard 53 is used to input a EDL title, operation instructions and the like. The mouse 54 is used to operate an arrow mark displayed on the CRT 52 for instructing an operation. The jog pad 55 is used for instructing an operation.

A card 45 connects the first hard disk drive of an IDE type 46, where IDE is a name of an example of information transmission bus. The first hard disk drive 46 stores control information for executing each of the operations of AV acquisition, AV information reproduction, EDL creation, EDL reproduction, EDL correction and EDL reproduction, and for storing an editing determination list (EDL) as editing information.

An AV compressor 47 compresses input AV information and transmits it through the PCI-bus 42 to the memory device 41. The transmitted information is further transmitted from the memory device 41 to the second hard disk drive 51 and stored therein according to an instruction of the CPU 40.

A first AV expander 48 reads the compressed AV information from the second hard disk drive 51 and expands it to the original AV information to be output. A second AV expander 49 reads the compressed AV information from the second hard disk drive 51 and expands it to the original AV information to be output. Two channel reproduction is possible by using the second AV expander 49 with the first AV expander 48.

An SPC (SCSI Protocol Control) card 50 connects the second hard disk drive 51 of SCSI type, where SCSI is a name of an example of information transmission bus. The second hard disk drive 51 stores audiovisual information. In this embodiment, two hard disk drives are used, but if necessary a necessary number of hard disk drives 51 are used besides the SPC card 50 according to the storage capacity for the audiovisual information.

As mentioned above, the CPU 40 executes operations of AV information acquisition, AV information reproduction, EDL creation and EDL reproduction according to the control information stored in the first hard disk drive 46. Next, the operations are explained.

In the AV information acquisition 71, AV information inputted to the AV information compressor 47 is compressed and is written to the hard disk drive 51 through the bus 42. In concrete, the CPU 40 starts the operation according to an instruction with the keyboard 53, the mouse 54 or the jog pad 55. The CPU 40 outputs an instruction to the AC compressor 47, and the AV compressor 47 compresses the input AV information and stores it in an inner memory device. It sends a transmission request when the amount of the compressed information exceeds a predetermined limit. In correspondence to the request, the CPU 40 sends a transmission instruction to the AV compressor 47 to transmit the compressed information to the memory device 41 at a designated position by the determined amount. The AV compressor 47 transmits the compressed information, and send a completion report to the CPU 40. During this time, the AV compressor 47 continues compression of input information. The CPU 40 sends an instruction to the SPC card 50 to store the information in the memory device 41 in a designated position in the second hard disk drive 51. The SPC card 50 executes the operation, and a completion report is sent to the CPU 40. Then, the AV compressor 47 sends again a transmission request to the CPU 40, and the above operation is repeated. When the amount designated by the keyboard 53, the mouse 54 or the jog pad 55 is completed or the end is instructed thereby, the CPU 40 sends a stop instruction to the AV compressor 47. The compression information created by the AV compressor 47 in a predetermined time is recorded in the second hard disk drive 51 in a constant time at a sufficiently high speed, so as not to drop record information in the hard disk drive 51.

Next, the AV information reproduction 72 is explained. The audiovisual (AV) information written to the hard disk drives 5 (50, 51) is transmitted through the bus 4 (42) to the AV information expander 2 or 3 (48 or 49) and is expanded there to recover the original signals. The recovered AV information is displayed with a display apparatus 8 (43, 52) such as a monitor television set for displaying AV information. In this embodiment, two channels of AV information can be output by using the AV information expanders 2, 3 (48, 49). In concrete, operation start at a designated reproduction position, and operation stop are instructed with the keyboard 53, the mouse 54 or the jog pad 55. The CPU 40 reads information from the designated reproduction position in the second hard disk drive 5 (50, 51), and sends it to the AV expander 2 (48) or 3 (49). It is transmitted repeatedly by predetermined amounts. When read of the amount designated by the keyboard 53, the mouse 54 or the jog pad 55 is completed or the stop is instructed thereby, the CPU 40 sends an instruction to stop the read to the second hard disk drive 5 (50, 51).

Next, the EDL creation 73 is explained. An editing determination list (EDL) is described by specifying a start end (in point) and an final end (out point) of an effective part (event) while reproducing the recorded audiovisual information, and by writing the event information in the order of reproduction. In the editing, the audiovisual information is edited so that the combination of the effective information group has the desired content and the length of the edited information becomes the desired length. The editing information determined as mentioned above is called as editing determination list (EDL). The editing determination list is stored with an EDL title in the hard disk drive 6 (46). In the EDL reproduction 74, a specified portion in the editing determination list stored in the first hard disk drive 46 is reproduced by referring to the editing determination list stored in the hard disk drive 6 (46).

In the EDL creation 73 which is explained further, a plurality of events (effective information) in the recorded audiovisual information are designated, and position information on their editing points (start and final positions), position information in the record (event accumulation time), and switching information from a previous event to a current event (cut, special effect and the like) are described successively. While reproducing the audiovisual information from the VCR, start and final ends of an event are designated by operating the keyboard 53, the mouse 54 or the jog pad 55. This is repeated for creating the editing determination list. Cutting is automatically set as the switching information, but when a special effect is desired, an operation therefor is performed. The EDL information is stored in the hard disk drive 46 for each input of the start and final ends. The EDL title is automatically created, but it may be designated.

In the editing determination list, the position of audiovisual information is specified by a time code and a tape number. For example, in Japan and the United State of America, a television picture has 30 pictures per second, and each picture is called as frame. Each frame is displayed as a time data such as 01:23:45:15 (one o'clock, 23 minutes, 45 seconds, 15-th frame). This is called as time record. Different pictures may have the same time record. The position is specified by a time record (8-digit number) and a tape number (2-digit number from 01 to 99). This is similar when the audiovisual information is stored in a storage device such as a hard disk drive.

When an effective part (event) is set in the EDL creation 73, in order to view the audiovisual information for confirmation, a function (retrieve 75) is necessary to retrieve a specified position and to display the picture at the position as a mode in the AV information reproduction 72. Usually, an editor takes a memo of the positions as time records of audiovisual information. When a picture is confirmed, retrieve is instructed by inputting the time record information thereof. Thus, the display position is moved to the desired position, and the picture is reproduced for confirmation. Usually, reproduction is repeated for confirmation. Relation of a picture to other pictures is also checked many times. For example, after a retrieved picture is viewed, the original picture is viewed again. Thus, in the editing, retrieve is performed one after another. In this embodiment, when a specified position (or retrieve destination position) is retrieved, audiovisual information from the current position to the destination position is displayed intermittently, or a picture on a state under retrieve can be displayed, so that a user can confirm a state under retrieve or completion of retrieve. Further, a user can select one of display modes on retrieve (constant time retrieve, constant speed retrieve, accelerating and decelerating retrieve). This is explained later with reference to FIG. 7.

In the EDL reproduction 74, a specified portion in the editing determination list stored in the first hard disk drive 46 is reproduced. It is performed with the keyboard 53, the mouse 54 or the jog pad 55.

Figure 3:
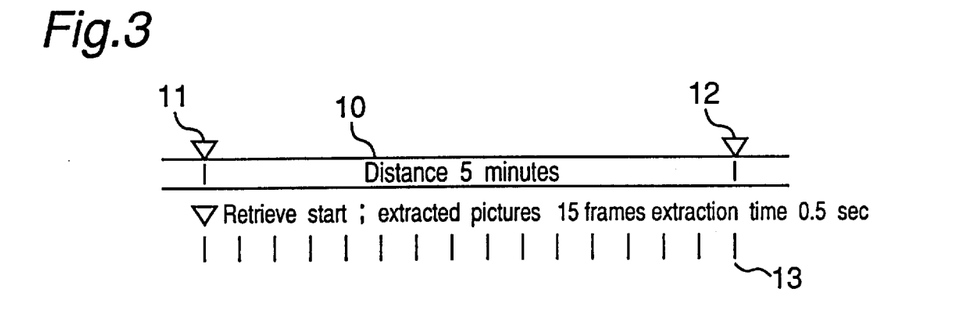
FIG. 3 is a diagram to illustrate an example of constant time retrieve.
Figure 4:
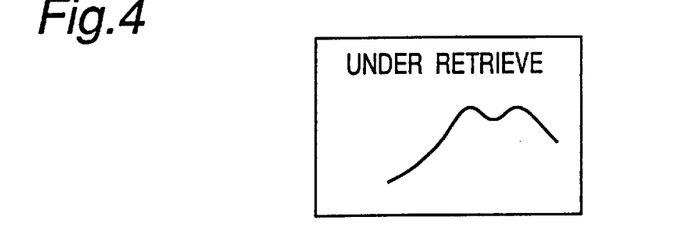
FIG. 4 is a diagram of a picture to which a picture meaning a state "under retrieve" is added.

FIG. 3 illustrates an example of the constant time retrieve. The constant time retrieve is a mode where retrieve is completed in a constant time irrespective of the distance of the moving picture information. If the distance is set to five minutes from the current position 11 of the picture to a retrieve destination 12, pictures 13 of fifteen frames are extracted and displayed by equally dividing the pictures of five minutes from the retrieve start position, and the picture at the retrieve destination is displayed after 0.5 second. A user can select to display the pictures of fifteen frames as the extracted pictures 13 themselves or as the extracted pictures 13 mixed with a picture representing a state under retrieve, or to display the picture of a phrase "UNDER RETRIEVE". In the constant time retrieve mode, retrieve is completed for a predetermined constant time irrespective of the distance. The time of 0.5 second may be changed to a different time by a user.

Figure 5:
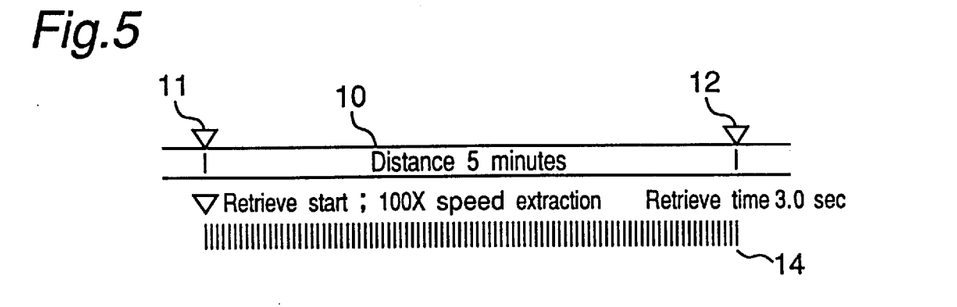
FIG. 5 is a diagram to illustrate an example of constant speed retrieve.

FIG. 5 illustrates an example of the constant speed retrieve. Pictures 14 are displayed by extracting frames of 100 times speed in the pictures of five minutes (one picture is extracted from one hundred pictures). Thus, it takes three seconds to display the picture of the retrieve destination. Retrieve time is proportional to retrieve distance. If the retrieve destination is near, it is necessary to decrease the speed for extraction in order to set recognition time about 0.5 second. On the other hand, if the retrieve destination is far, the extraction ratio may be decreased or the maximum speed may be increased for shortening unnecessary time.

Figure 6:
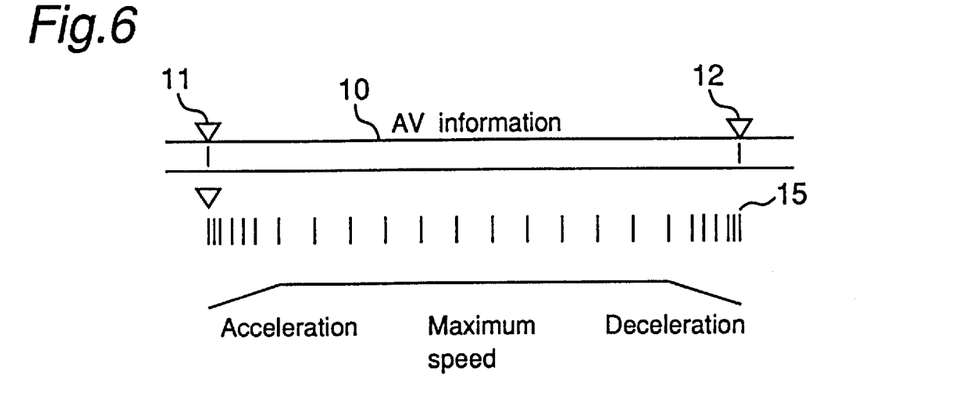
FIG. 6 is a diagram to illustrate an example of accelerating and decelerating retrieve.

FIG. 6 illustrates an example of the accelerating and decelerating retrieve. The accelerating and decelerating retrieve is a mode where pictures are viewed more near the current position 11 and near the retrieve destination position 12. As shown at the bottom side of FIG. 6, the speed is increased from the current position 18, the position is moved at the highest speed, and the speed is decreased near the destination position 19 to arrive at the destination position 19. Because of deceleration near the destination position, pictures near the destination position can be confirmed more surely.

Figure 7:
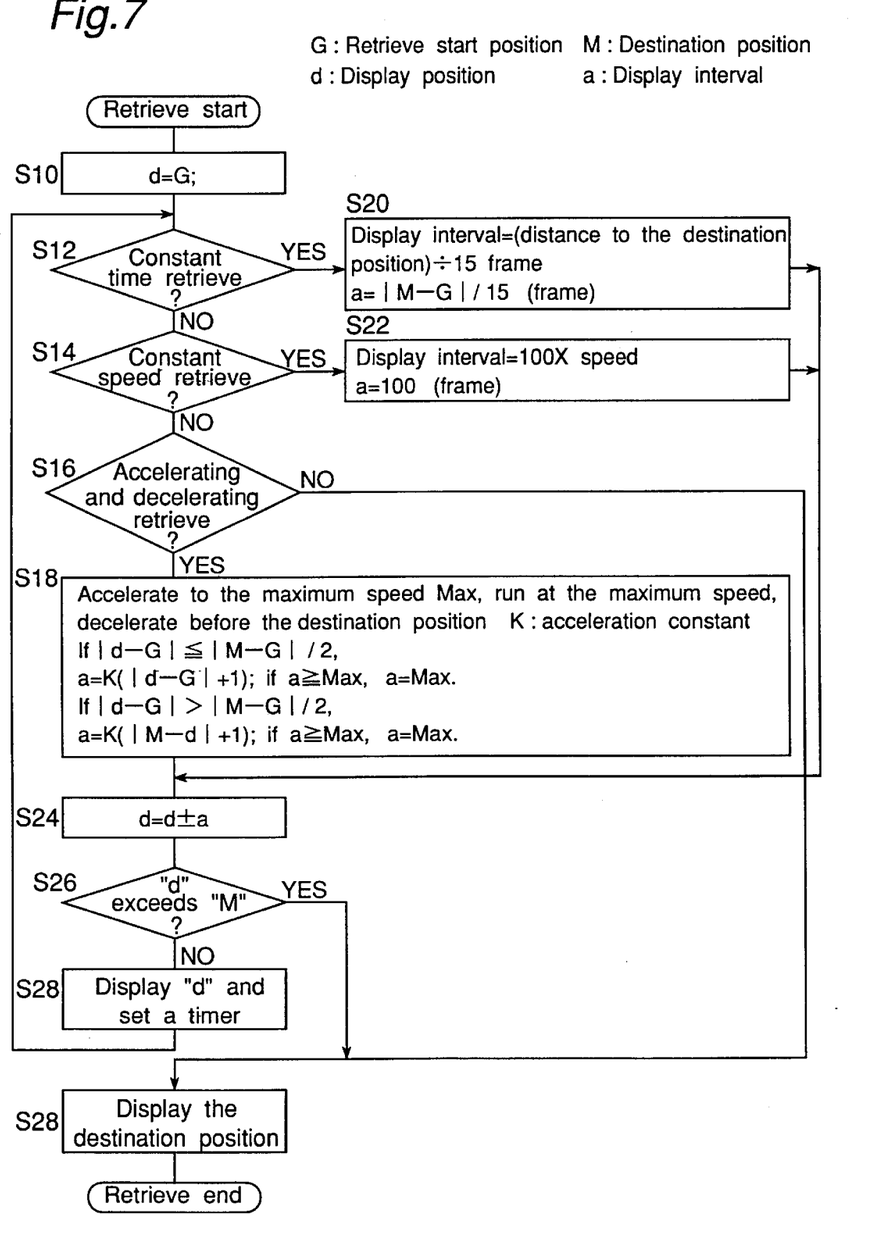
FIG. 7 is a flowchart of retrieve in the editing apparatus according to an example of the invention.

FIG. 7 illustrates a flow of an example of the retrieve operation by the CPU 40. In this flow, in the audiovisual information, "G" denotes retrieve start position, "M" denotes retrieve destination position, "d" denotes display position and "a" denotes display interval. Retrieve is performed based on the editing determination list, and it is started by operating the keyboard 53, the mouse 54 or the jog pad 55. When retrieve is started, the display position "d" is set first to the retrieve start position "G" (S10). Next, it is checked whether the designated mode is the constant time retrieve or not (S12). If the mode is the constant time retrieve, the display interval "a" is calculated as {(the distance between the destination position "M" and the retrieve start position "G") divided by 15} (S20).

Next, the display position "d" is moved near the destination position by adding or subtracting "a" to or from the display position "d" (S24), and it is checked whether the obtained display position "d" exceeds the destination position "M" or not (S26). If the display position "d" does not exceed the destination position "M", the picture at the display position "d" is displayed, and a time for one frame is waited (S28).

Then, the flow returns to S12, and the processes are repeated until the display position exceeds the destination position "M". When the display position exceeds the destination position "M" (YES at S26), the picture at the destination position is displayed (S30), and the retrieve is completed.

When it is checked that the mode is not the constant time retrieve (NO at S12), it is checked next whether the mode designated is the constant speed retrieve or not (S14). If the mode is the constant speed retrieve, for example, the display interval "a" is set to 100 for 100 times speed (S22) Next, the flow proceeds to S24, and the display position "d" is moved near the destination position by adding or subtracting "a" to the display position "d" (S24), and this is repeated, similarly to the constant time retrieve to arrive at the destination position.

When it is checked that the designated mode is not the constant speed retrieve (NO at S14), it is checked next whether the designated mode is the accelerating and decelerating retrieve or not (S16).

If the designated mode is not the accelerating and decelerating retrieve (NO at S16), the picture at the destination position is displayed (S28), and the retrieve is completed.

If the designated mode is the accelerating and decelerating retrieve (YES at S16), the display interval "a" is calculated as follows (S18). If the display position "d" is nearer to the middle point between the retrieve start position "G" and the destination position "M", "a" is set to the distance between the retrieve start position "G" and the display position "d" (or an absolute value of the difference between them) added with one and multiplied further with an acceleration constant "K". If the display position "d" is farther than the middle point, "a" is set to the distance between the display position "d" and the destination position added with one and multiplied further with an acceleration constant "K". The distance is added by one in order to prevent the occurrence of the value of "a" of zero which makes the operation stopped at the retrieve start position. If the value of "a" calculated above is larger than "Max", a=Max. The acceleration constant "K" and the maximum speed "Max" are constants which can be set by a user.

Next, the display position "d" is shifted towards the destination position by increasing or decreasing the display distance "a" calculated above (S24). If "a" is smaller than "Max", it is a primary function of the display position "d", so that the display position "d" moves as constant acceleration or deceleration. It is checked whether the display position "d" exceeds the destination position "M" or not (S26). The display position "d" arrives at the destination position "M", the picture at the destination position is displayed (S28), similarly to the constant time retrieve, and the retrieve is completed.

A user can select to overlap the picture of a phrase "under retrieve" to the extracted pictures. A user can also select the constant time retrieve, the constant speed retrieve, or the accelerating and decelerating retrieve.

As explained above, according to the invention, when retrieve operation is executed in a nonlinear editing apparatus, a user can recognize completion of retrieve and information near the destination position. Thus, the retrieve can be performed with a feeling similar to the editing using a prior art editing apparatus with VCRs. Further, a picture display method (mode) during retrieve can be selected by a user, and the pictures can be displayed according to a mode desired by a user.

Although the present invention has been fully described in connection with the preferred embodiments thereof, it is to be noted that various changes and modifications are apparent to those skilled in the art. Such changes and modifications are to be understood as included within the scope of the present invention.

What s claimed is:

1. An editing apparatus for editing audiovisual information including at least moving picture information and audio information accompanied therewith, comprising:

a first storage device operable to store input audiovisual information including moving pictures;

a display device operable to display moving pictures read from said first storage device;

an operation device operable to set editing information including time positions on the audiovisual information stored in said first storage device;

a second storage device operable to store editing information set by said operation device on the audiovisual information stored in said first storage device; and a display controller operable to instruct said display device to display moving pictures based on the editing information stored in said second storage device;

wherein according to an instruction to change a first picture at a first time position displayed currently by said display device to a second picture at a second time position in the moving pictures stored in said first storage device, said display controller is operable to select a number of selected pictures, from among the moving pictures stored in said first storage device, the selected pictures being selected between the first picture at the first time position and the second picture at the second time position in an order of time position in the moving pictures, the number of the selected pictures being smaller than a total number of the stored moving pictures that are between the first time position and the second time position, and to shift a currently displayed picture from the first picture at the first time position to the second picture at the second time position by instructing said display device to display the selected pictures sequentially according to the order of time position.

2. The editing apparatus according to claim 1, wherein said display controller is operable to select, as the selected pictures, pictures at time positions between the first time position and the second time position at equal intervals, and to instruct the display device to intermittently display the selected pictures.

3. The editing apparatus according to claim 2, wherein when said display controller operates to shift the currently displayed picture from the picture at the first time position to the picture at the second time position, while said display device is displaying pictures at time positions between the first and second time positions, said display device is operable to display additional visual information which indicates a state under retrieve at the same time.

4. The editing apparatus according to claim 2, wherein said second storage device comprises a hard disk, a semiconductor memory or an optical disk.

5. The editing apparatus according to claim 2, further comprising a compressor operable to compress the input audiovisual information and to send the compressed audiovisual information to said first storage device, and an expander operable to expand compressed information stored in said first storage device.

6. The editing apparatus according to claim 2, further comprising an audio reproduction device operable to extract audio information in correspondence to a picture to be displayed by said display device from the audiovisual information stored in said first storage device and to reproduce the audio information in correspondence to the audiovisual information.

7. The editing apparatus according to claim 1, wherein said display controller is operable to select, as the selected pictures, pictures of a predetermined number extracted intermittently at an equal interval between the first and second time positions.

8. The editing apparatus according to claim 7, wherein when said display controller operates to shift the currently displayed picture from the picture at the first time position to the picture at the second time position, while said display device is displaying pictures at time positions between the first and second time positions, said display device is operable to display additional visual information which indicates a state under retrieve at the same time.

9. The editing apparatus according to claim 7, wherein said second storage device comprises a hard disk, a semiconductor memory or an optical disk.

10. The editing apparatus according to claim 7, further comprising a compressor operable to compress the input audiovisual information and to send the compressed audiovisual information to said first storage device, and an expander operable to expand compressed information stored in said first storage device.

11. The editing apparatus according to claim 7, further comprising an audio reproduction device operable to extract audio information in correspondence to a picture to be displayed by said display device from the audiovisual information stored in said first storage device and to reproduce the audio information in correspondence to the audiovisual information.

12. The editing apparatus according to claim 1, wherein said display controller is operable to select as the selected pictures:

pictures extracted at an interval in proportion to a distance between the first time position and a display position, or at an interval for a maximum display speed when the interval exceeds an interval for the maximum display speed, up to a position where the display position reaches a middle point between the first and second time positions, so as to display the selected pictures by shifting the display position at an increasing speed or at the maximum display speed; and after a position where the display position exceeds the middle point, pictures extracted at an interval in proportion to a distance between the display position and the second time position, or at an interval for the maximum display speed when the interval exceeds the interval for the maximum display speed, so as to display the pictures by shifting the display position at the maximum display speed or at a decreasing speed.

13. The editing apparatus according to claim 12, wherein when said display controller operates to shift the currently displayed picture from the picture at the first time position to the picture at the second time position, while said display device is displaying pictures at time positions between the first and second time positions, said display device is operable to display additional visual information which indicates a state under retrieve at the same time.

14. The editing apparatus according to claim 12, wherein said second storage device comprises a hard disk, a semiconductor memory or an optical disk.

15. The editing apparatus according to claim 12, further comprising a compressor operable to compress the input audiovisual information and to send the compressed audiovisual information to said first storage device, and an expander operable to expand compressed information stored in said first storage device.

16. The editing apparatus according to claim 12, further comprising an audio reproduction device operable to extract audio information in correspondence to a picture to be displayed by said display device from the audiovisual information stored in said first storage device and to reproduce the audio information in correspondence to the audiovisual information.

17. The editing apparatus according to claim 1, wherein when said display controller operates to shift the currently displayed picture from the picture at the first time position to the picture at the second time position, while said display device is displaying pictures between the first and second time positions, said display device is operable to display additional visual information which indicates a state under retrieve at the same time.

18. The editing apparatus according to claim 17, wherein said second storage device comprises a hard disk, a semiconductor memory or an optical disk.

19. The editing apparatus according to claim 17, further comprising a compressor operable to compress the input audiovisual information and to send the compressed audiovisual information to said first storage device, and an expander operable to expand compressed information stored in said first storage device.

20. The editing apparatus according to claim 17, further comprising an audio reproduction device operable to extract audio information in correspondence to a picture to be displayed by said display device from the audiovisual information stored in said first storage device and to reproduce the audio information in correspondence to the audiovisual information.

21. The editing apparatus according to claim 1, wherein said second storage device comprises a hard disk, a semiconductor memory or an optical disk.

22. The editing apparatus according to claim 21, further comprising a compressor operable to compress the input audiovisual information and to send the compressed audiovisual information to said first storage device, and an expander operable to expand compressed information stored in said first storage device.

23. The editing apparatus according to claim 21, further comprising an audio reproduction device operable to extract audio information in correspondence to a picture to be displayed by said display device from the audiovisual information stored in said first storage device and to reproduce the audio information in correspondence to the audiovisual information.

24. The editing apparatus according to claim 1, further comprising a compressor operable to compress the input audiovisual information and to send the compressed audiovisual information to said first storage device, and an expander operable to expand compressed information stored in said first storage device.

25. The editing apparatus according to claim 24, further comprising an audio reproduction device operable to extract audio information in correspondence to a picture to be displayed by said display device from the audiovisual information stored in said first storage device and to reproduce the audio information in correspondence to the audiovisual information.

26. The editing apparatus according to claim 1, further comprising an audio reproduction device operable to extract audio information in correspondence to a picture to be displayed by said display device from the audiovisual information stored in said first storage device and to reproduce the audio information in correspondence to the audiovisual information.

27. An editing method for reading and displaying audiovisual information from a storage medium storing audiovisual information including at least moving picture information and audio information accompanied therewith based on editing information, said method comprising:

storing input audiovisual information, including moving pictures, in a first storage device;

storing, in a second storage device, editing information of the audiovisual information stored in the first storage device;

displaying moving pictures read from the first storage device;

selecting according to an instruction to change a first picture at a first time position displayed currently by a display device to a second picture at a second time position in the moving pictures stored in the first storage device, a number of selected pictures from among the moving pictures stored in the first storage device, the selected pictures being selected between the first time position and the second time position in the moving pictures in an order of time position, the first picture and the second picture being included in the selected pictures, the number of the selected pictures being smaller than a total number of the stored moving pictures that are between the first time position and the second time position; and shifting a currently displayed picture from the first picture at the first time position in the moving pictures to the second picture at the second time position in the moving pictures by displaying the selected pictures sequentially according to the order of time position.

28. The editing method according to claim 27, wherein said selecting of the selected pictures comprises selecting pictures at time positions spaced at equal intervals between the first time position and the second time position.

29. The editing method according to claim 28, wherein said shifting of the currently displayed picture from the picture at the first time position to the picture at the second time position comprises displaying additional visual information which indicates a state under retrieve at the same time that the pictures between the first and second time positions are displayed.

30. The editing method according to claim 28, further comprising compressing the input audiovisual information and sending the compressed audiovisual information to the first storage device, and expanding compressed information stored in the first storage device.

31. The editing method according to claim 28, further comprising:

extracting audio information, in correspondence to a picture to be displayed by the display device, from the audiovisual information; and reproducing the audio information in correspondence to the audiovisual information.

32. The editing method according to claim 27, wherein said selecting of the selected pictures comprises selecting pictures of a predetermined number at an equal interval between the first and second positions.

33. The editing method according to claim 32, wherein said shifting of the currently displayed picture from the picture at the first time position to the picture at the second time position comprises displaying additional visual information which indicates a state under retrieve at the same time that the pictures between the first and second time positions are displayed.

34. The editing method according to claim 32, further comprising compressing the input audiovisual information and sending the compressed audiovisual information to the first storage device, and expanding compressed information stored in the first storage device.

35. The editing method according to claim 32, further comprising:

extracting audio information, in correspondence to a picture to be displayed by the display device, from the audiovisual information; and reproducing the audio information in correspondence to the audiovisual information.

36. The editing method according to claim 27, wherein said selecting of the selected pictures comprises selecting:

pictures extracted at an interval in proportion to a distance between the first time position and a display position, or at an interval for a maximum display speed when the interval exceeds an interval for the maximum display speed, up to a position where the display position reaches a middle point between the first and second time positions, so as to display the pictures by shifting the display position at an increasing speed or at the maximum display speed; and after a position where the display position exceeds the middle point, pictures extracted at an interval in proportion to a distance between the display position and the second time position, or at an interval for maximum display speed when the interval exceeds the interval for the maximum display speed, so as to display the pictures by shifting the display position at the maximum display speed or at a decreasing speed.

37. The editing method according to claim 36, wherein said shifting of the currently displayed picture from the picture at the first time position to the picture at the second time position comprises displaying additional visual information which indicates a state under retrieve at the same time that the pictures between the first and second time positions are displayed.

38. The editing method according to claim 36, further comprising compressing the input audiovisual information and sending the compressed audiovisual information to the first storage device, and expanding compressed information stored in the first storage device.

39. The editing method according to claim 36, further comprising:
    extracting audio information, in correspondence to a picture to be displayed by the display device, from the audiovisual information; and
    reproducing the audio information in correspondence to the audiovisual information.

40. The editing method according to claim 27, wherein said shifting of the currently displayed picture from the picture at the first time position to the picture at the second time position comprises displaying additional visual information which indicates a state under retrieve at the same time that the pictures between the first and second time positions are displayed.

41. The editing method according to claim 40, further comprising compressing the input audiovisual information and sending the compressed audiovisual information to the first storage device, and expanding compressed information stored in the first storage device.

42. The editing method according to claim 40, further comprising:
    extracting audio information, in correspondence to a picture to be displayed by the display device, from the audiovisual information; and
    reproducing the audio information in correspondence to the audiovisual information.

43. The editing method according to claim 27, further comprising compressing the input audiovisual information and sending the compressed audiovisual information to the first storage device, and expanding compressed information stored in the first storage device.

44. The editing method according to claim 43, further comprising:
    extracting audio information, in correspondence to a picture to be displayed by the display device, from the audiovisual information; and
    reproducing the audio information in correspondence to the audiovisual information.

45. The editing method according to claim 27, further comprising:
    extracting audio information, in correspondence to a picture to be displayed by the display device, from the audiovisual information; and
    reproducing the audio information in correspondence to the audiovisual information.

* * * * *